United States Patent [19]
Betts et al.

[11] Patent Number: 5,475,711
[45] Date of Patent: Dec. 12, 1995

[54] SYSTEM FOR CHANNEL CAPACITY MODULATION

[75] Inventors: William L. Betts, St. Petersburg; Edward S. Zuranski, Largo, both of Fla.

[73] Assignee: AT&T Corp., Murray Hill, N.J.

[21] Appl. No.: 307,497

[22] Filed: Sep. 14, 1994

Related U.S. Application Data

[63] Continuation of Ser. No. 968,765, Oct. 30, 1992, abandoned.

[51] Int. Cl.$^6$ ........................................ H04B 1/66
[52] U.S. Cl. ..................... 375/240; 375/222; 375/377
[58] Field of Search ........................... 375/3.1, 7–10, 375/37, 121, 122; 370/13.1, 17

[56] References Cited

U.S. PATENT DOCUMENTS

| | | | |
|---|---|---|---|
| 4,700,362 | 10/1987 | Todd et al. | 375/30 |
| 4,756,007 | 7/1988 | Qureshi et al. | 375/8 |
| 4,771,232 | 9/1988 | Betts et al. | 324/77 B |
| 4,833,690 | 5/1989 | Zuranski et al. | 375/10 |
| 4,893,305 | 1/1990 | Fernandez et al. | 375/8 |
| 5,008,903 | 4/1991 | Betts et al. | 375/60 |
| 5,048,054 | 9/1991 | Eyuboglu et al. | 375/8 |
| 5,103,227 | 4/1992 | Betts | 341/61 |

OTHER PUBLICATIONS

William L. Betts, DFE versus Preemphasis for V.fast, International Telegraph and Telephone Consultative Committee (CCITT). Paper presented in Baltimore, TR30 meeting, Apr. 1991.

Primary Examiner—Stephen Chin
Assistant Examiner—Don N. Vo
Attorney, Agent, or Firm—Samuel R. Williamson

[57] ABSTRACT

A method and apparatus for optimizing parameters selectable by an analog modem for operation on any bandwidth-constrained channel is provided. Through the addition of circuitry for performing an optimization process, the modem is configured for identifying the optimum bandwidth and maximum data rate for use over a selected bandwidth-constrained channel. In the process of optimizing the parameters for operation on the selected bandwidth-constrained channel, a measurement of the signal and noise spectrum present on the selected channel is determined. And from this measurement, the optimum bandwidth, maximum data rate for the transmission of data over the selected bandwidth-constrained channel and a modulus for performing a modulus conversion of the data for transmission are provided. The modem is then trained to operate using these optimized parameters for transmission of the data.

25 Claims, 6 Drawing Sheets

SYSTEM FOR CHANNEL CAPACITY MODULATION

This application is a continuation of application Ser. No. 07/968,765, filed on Oct. 30, 1992, which is now abandoned.

BACKGROUND OF THE INVENTION

1. Technical Field

This invention relates to the transmission of data and, in particular, to the transmission of data over voiceband telephone channels using modems.

2. Description of the Prior Art

Voiceband telephone channels have a limited or constrained bandwidth and are thus limited in the rate at which data may be transmitted there over. Depending on the length of the line comprising a voiceband channel and the circuits used to switch such channel, the spectral characteristics of each bandwidth constrained channel may differ with each modem connection established thereover. To obtain a satisfactory data transfer, therefore, modems have traditionally been designed to consider the worst case line for a particular data rate to insure reasonably accurate data transfer at the selected rate.

A number of advances have been achieved in allowing analog modems to more efficiently transmit digital data over voiceband channels. One recent advance in the design of analog modems is provided in U.S. Pat. No. 4,771,232 issued on Sep. 13, 1988, which is hereby incorporated by reference. In this patent, a system and method are disclosed for extracting spectral data from the actual received modem signal that has been shaped by the amplitude characteristics of the line. This extraction of data is achieved without interrupting or affecting the data traffic through the modem and without the use of test tones.

Another recent advance in the design of analog modems is provided in U.S. Pat. No. 5,008,903 issued on Apr. 16, 1991, which is hereby incorporated by reference. In this patent, an apparatus and method are disclosed for calculating preemphasis coefficients for a transmitting modem based upon the noise spectrum as it is received at the receiving modem. A noise spectrum analysis circuit calculates a difference between the transmitted data and the actually received data. This difference is used to compute a discrete Fourier transform of the noise spectrum, which is transmitted back to the transmitting modem on the secondary channel. This data is then used to calculate new pre-emphasis coefficients for use in subsequent transmissions by the transmitting modem.

Other recent design advances are set forth in U.S. Pat. No. 5,103,227 issued Apr. 7, 1992 and U.S. Pat. No. 5,230,010, issued Jul. 20, 1993, both of which are hereby incorporated by reference. U.S. Pat. No. 5,103,227 proposes a fractional rate encoder which provides modulus conversion of an incoming data stream into an output stream having frames of a particular structure. U.S. Pat. No. 5,230,010, issued Jul. 20, 1993 proposes achieving fractional rate modulation by separating incoming data into frames of bits with each frame being partitioned into bit words of unequal lengths.

Although these advances improve the manner in which analog modems transmit digital data over voiceband channels, none of this art identifies the optimum boundary conditions then existing on a bandwidth constrained channel for adapting parameters for maximizing the transmission of data over the channel.

SUMMARY OF THE INVENTION

In accordance with the invention, there is provided a method and apparatus for optimizing parameters selectable by an analog modem for operation on any bandwidth-constrained channel. In preferred embodiments, the modem identifies the optimum bandwidth and maximum data rate for use over a selected bandwidth-constrained channel. In obtaining the optimum bandwidth and maximum data rate for the selected channel, the modem transmits a wideband signal over the channel for measuring the signal and noise spectrum for the channel. Any one from a set of three loss functions is usable for optimizing a corresponding one of three modulation techniques employable in accordance with the invention. A selected one of the three loss functions is used to compute the maximum data rate as a function of the lower and upper band edge frequencies. From the lower and upper frequencies and the noise spectrum, the optimum bandwidth and carrier frequency are determined. From the maximum data rate, the optimum bandwidth and a number of bits directly encoded by a trellis encoder, a modulus or number of points in the signal constellation is determined.

BRIEF DESCRIPTION OF THE DRAWING

The invention and its mode of operation will be more clearly understood from the following detailed description when read with the appended drawing in which.

DETAILED DESCRIPTION

A channel capacity modulation system which achieves the highest possible data rate on any limited or constrained bandwidth channel or communication link is provided in accordance with the invention. The system uses any of several "loss" functions, to be described in detail later herein, to optimize data rate as a function of channel spectrum and signal-to-noise ratio (SNR). Being able to transfer data at the maximum permitted data rate provides the desirable benefit of being able to minimize the connect time and, accordingly, the cost of any dial call.

A number of steps are executed by the system in achieving this advantageous operation. First, the system determines the spectrum and SNR of the communication line. The amplitude response of the communication line in the band occupied by the modem signal is obtained without interrupting or affecting data signal traffic through the modem.

Figure 1:
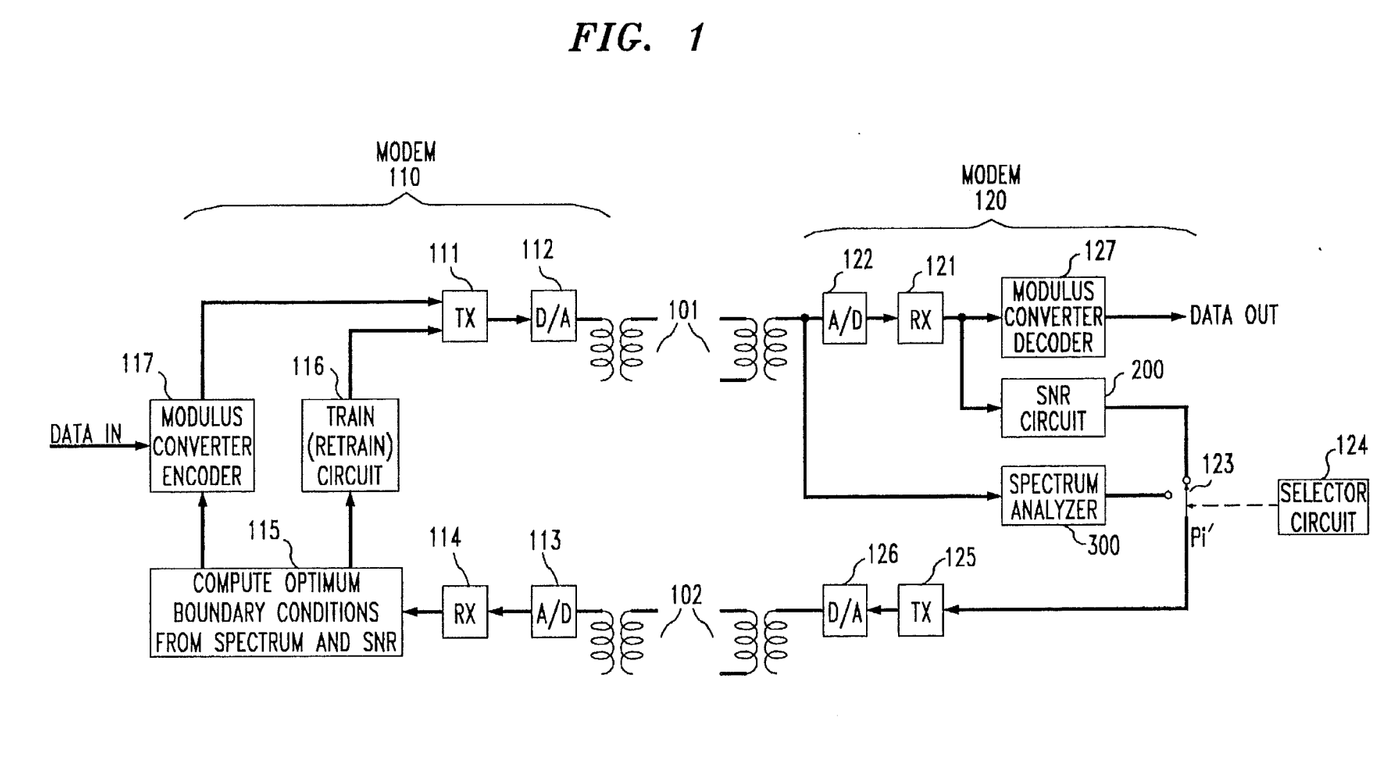
FIG. 1 shows circuitry within a transmit and receive modem for measuring frequency dependent signal-to-noise ratios on a communication line and also spectral data from the actual received modem signal that has been shaped by the amplitude characteristics of the line, in accordance with the invention.

With reference to FIG. 1, there is shown circuitry which measures frequency dependent signal-to-noise ratios on a communication link and also spectral data from the actual received modem signal that has been shaped by the amplitude characteristics of the link. Included in the circuitry are a modem 110 which transmits quadrature amplitude modulation (QAM) data signals to a modem 120 over a communication line 101. Usable as both modem 110 and modem 120 is the AT&T Paradyne 19200 BPS APL modem with the minimal modification described herein.

Modem 110 includes a conventional modem transmitter 111 which uses, for example the V.32bis type of trellis coding. The training sequence is similar to V.33 and V.32, and includes, in accordance with the invention, an extra segment to convey the spectral information. A data-in signal from a DTE device (not shown) is provided to a modulus converter encoder 117, described in more detail later herein. The output of the modulus converter encoder 117 is provided to the transmitter 111. The signals from the transmitter 111, which are in a digital format, are converted to analog format by digital-to-analog converter 112 for transmission across communications line 101 to modem 120.

Modem 120 includes a conventional modem receiver 121 which, like the modem transmitter 111, also uses, for example the V.32bis type of trellis coding. The training sequence also is similar to V.33 and V.32. Analog-to-digital converter 122 in modem 120 converts the analog signal from communications line 10 1 into a digital format for input into the receiver 121. The output of the receiver 121 is provided both to a modulus converter decoder 127 and to a SNR (signal-to-noise ratio) circuit 200. The modulus converter decoder 127 reconstructs the original data presented to the modulus converter encoder 117 in the modem 110 and couples this data to a DTE device (not shown). The SNR circuit 200 performs a frequency dependent noise spectrum analysis from which frequency domain information of the noise signal ($_i$, i=1,n) is output, said frequency domain information being derived, for example, by discrete Fourier transform techniques as described later herein with reference to FIG. 2.

The analog signal from communications line 101 is also provided to a spectrum analyzer circuit 300 which can provide information indicative of a frequency dependent amplitude response of a transmission line such as communications line 101. This analyzer circuit 300 provides this response without interrupting or affecting the data traffic through the modem 120, as further described later herein with reference to FIG. 3.

The outputs of both the SNR circuit 200 and the spectrum analyzer circuit 300 are coupled to a switch 123, controlled by a selector circuit 124, for transmission to the modem 110 over, for example, a secondary channel 102. This secondary channel may be, for example, a sideband of the primary channel 101. Although a secondary channel for this transmission is employed, it is to be understood that use of such channel is optional and not crucial to the invention. The outputs from these circuits may also be provided from the modem 120 to the modem 110 over the primary channel 101.

A secondary channel transmitter 125 transmits the results of the noise spectrum analysis ($P_i$,i=1,,n) rom the SNR circuit 200 and the frequency dependent amplitude response from the spectrum analyzer circuit 300, along with other communications network control parameters, on the secondary channel 102. These parameters are provided through the secondary channel 102 via digital-to-analog converter 126 to analog-to-digital converter 113 in the modem 110.

The output of the analog-to-digital converter 113 is provided to a secondary channel receiver 114 for receiving the parameters sent from secondary channel transmitter 126 through the secondary channel 102. The secondary channel receiver 114 transmits these parameters to a compute block 115 which calculates the optimum boundary conditions for the channel 101 from the noise spectrum analysis and the frequency dependent amplitude provided by the modem 120. The compute block 115 also controls whether the data into the modulus converter encoder 117 or the signal from the train/retrain circuit 116 is provided to the transmitter 111. During normal operation, the data-in signal is coupled to the transmitter 111. During a train/retrain period, the signal from the circuit 116 is coupled to the transmitter 111.

The train/retrain circuit 116 receives the output of the compute block 115 for respectively configuring or reconfiguring the modem transmitter 111 for providing the best performance in transmitting data over the channel 101. Although illustratively shown in the modem 110, it is to be understood that both the compute block 115 and the retrain portion of the circuit 116 alternatively may be located in the modem 120. In such an alterative arrangement, the modem 120 would compute the values for the optimum boundary conditions on the channel and transmit these values to the modem 110.

Figure 2:
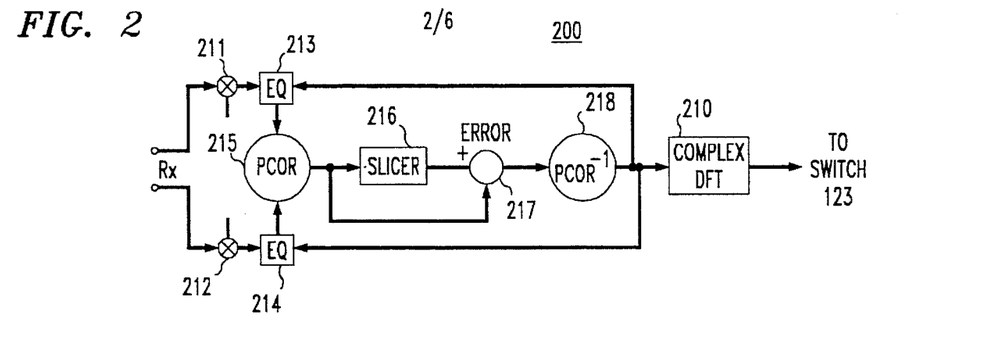
FIG. 2 is a schematic of signal-to-noise ratio circuit which determines a frequency dependent noise spectrum analysis of a channel, in accordance with the invention.

Referring next to FIG.2, there is shown the details of the SNR circuit 200. The SNR circuit 200, including the complex DFT (discrete Fourier transform) block 210, calculates a frequency spectrum ($P_i$,i=1,n) of the noise at n frequencies. This n may be, for example, 5 frequencies-709, 1145, 1800, 2455 and 2891 Hertz. These frequencies are chosen from a 22 point discrete Fourier transform calculation so as to span the usable frequency of a telephone line. The spectrum is transmitted back to the transmitting modem 110 over the secondary channel. The frequency spectrum ($P_i$,i=1,5) of the noise expressed in a logarithm scale are converted to a linear scale ($F_i$,i=0,5) in compute block 115 of FIG. 1.

The SNR circuit 200 includes sinusoidal mixers 211, 212 for demodulation of the digital signal provided from the receiver 121 of FIG. 1. The demodulated signal from mixers 211,212 is equalized by linear equalizers 213, 214. These equalizers are the real and imaginary computations of one complex equalizer. The resulting signals are phase corrected by phase corrector 215 which results in an x-y signal representative of the complex plane to slicer 216. Slicer 216 includes constellation or eye pattern data which is used in the quadrature amplitude modulation scheme of the signal received by the receiver 121. Slicer 216 outputs the constellation point which is closest to the input of slicer 216. Therefore, the actual received point is input to slicer 216 and the presumed actual transmitted point is output from slicer 216. A comparator 217 subtracts the actual received point from the actual transmitted point so as to calculate an error signal which is representative of the noise signal at the given frequency. This error or noise signal is inversely related to the signal-to-noise ratio on the communications channel 101.

The resulting error signal is phase corrected by inverse phase corrector 218. The output of inverse phase corrector 218 is used to update the characteristics of linear equalizers 213, 214 and as an input to complex DFT block 210. Complex DFT block 210 converts the phase corrected noise signals in the time domain (i.e. successive values corresponding to successive frequencies) into the noise spectrum in the frequency domain.

Figure 3:
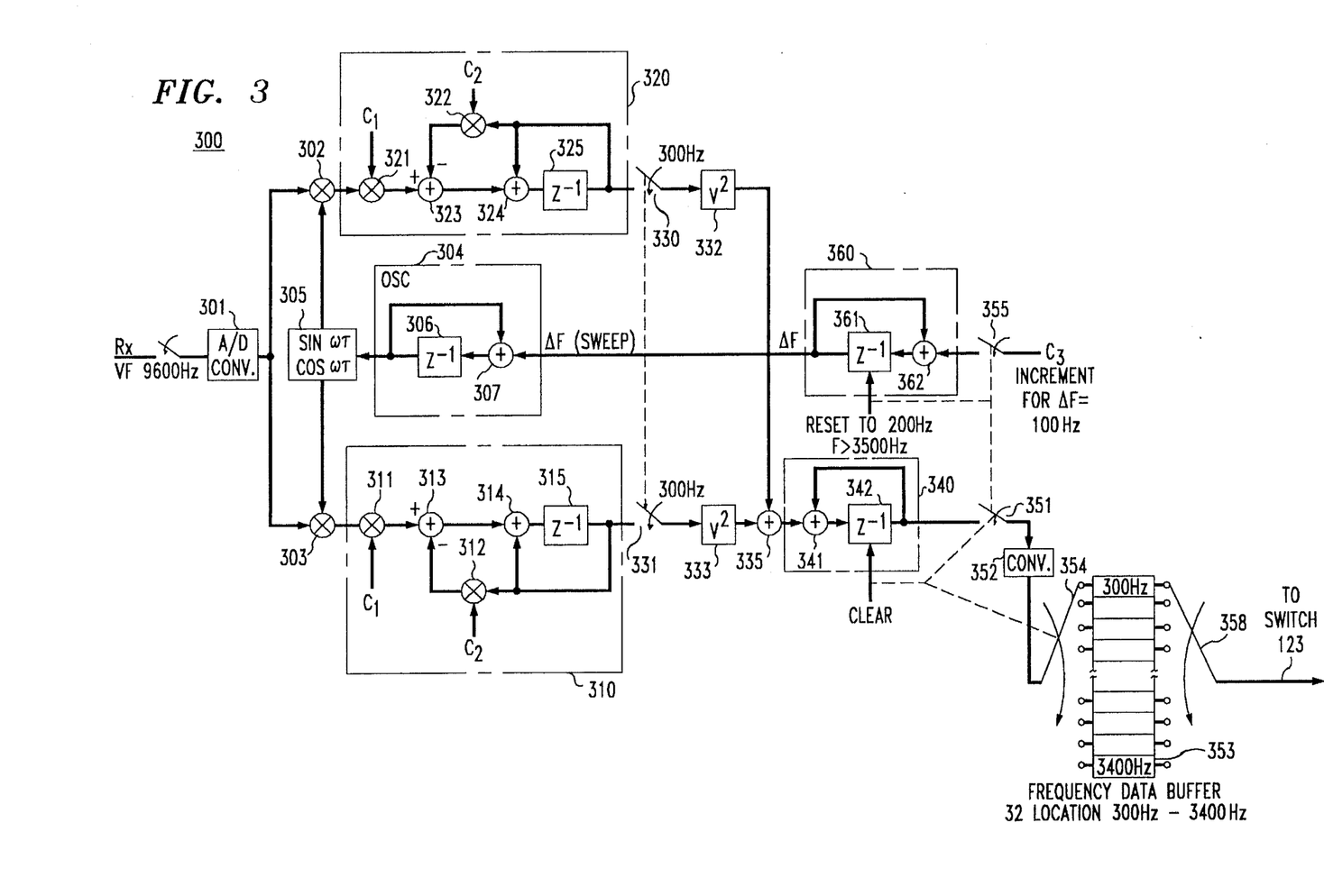
FIG. 3 is a schematic of a spectrum analyzer circuit which provides information indicative of a frequency dependent amplitude response of a transmission channel, in accordance with the invention.

Referring next to FIG. 3, there is shown the details of the spectrum analyzer 300 shown in FIG. 1. The analog signals from communications line 101 are sampled by A/D converter 301 at a 9600 Hz rate. The sampled data are mixed in the spectrum analyzer 300 by quadrature amplitude demodulators 302, 303 with an oscillator 304, after it has been modified by sine and cosine lookup element 305, to provide the selected one of 32 frequencies. Oscillator 304 comprises a delay element 306 and a summer 307.

The in-phase and quadrature data are filtered by low pass filters 310 and 320 respectively to remove the double frequency components of the mixing operation. Low pass filter 310 comprises multiplier element 311 for multiplying by a scaling constant and multiplier element 312 for multiplying by a filter constant, summers 313 and 314 and delay element 315. Low pass filter 320 comprises multiplier element 321 for multiplying by a scaling constant and multiplier element 322 for multiplying by a filter constant, summers 323 and 324, and delay element 325.

The outputs of low pass filters 310 and 320 contain a DC output that is proportional to the instantaneous energy present at the frequency selected by oscillator 304. The outputs of low pass filters 310 and 320 are sampled at a 300 Hz rate by sampler switches 330 and 331. This rate advantageously reduces the load on a processor (not shown) in the modem 120. The outputs of sampler switches 330 and 331 are squared by elements 332, 333. The outputs of squaring elements 332 and 333 are summed and integrated by an ideal integrator 340. Integrator 340 has an input from summer 335 and consists of summer 341 and a delay element 342. Integrator 340 integrates the energy present at the selected frequency for a predetermined period which is long enough to obtain an accurate measurement. At the end of the predetermined integration period switch 351 closes, the output of integrator 340 is converted to a logarithmic scale by converter 352 and the log value is stored in the appropriate frequency data memory locations in frequency data buffer 353. After the data is stored in buffer 353, integrator 340 is cleared, commutator 354 moves to the next frequency memory location in buffer 353, the frequency selection is incremented 100 Hz by integrator 360 which comprises delay element 361, and summer 362, and the integration begins at the new frequency. Switch 355 is used to load a constant into integrator 360. The constant is preselected so as to provide a 100 Hertz increment to the oscillator 304. This process repeats continuously updating all 32 memory locations.

For sending the spectral measurements, the data in buffer 353 is presented at a faster rate than it is stored. For achieving this faster rate, commutator 358 rotates through each of the 32 memory locations at, for example, a 2400 Hz rate. The digital data contained in the frequency memory location is applied through switch 123 to the modem 110.

In accordance with the invention, the system for channel capacity modulation provides a comparison of the performance differences between an ideal modulation technique such as multicarrier modulation (MCM) or decision feedback equalization (DFE), a 50% preemphasis spectral shaping (PRE) and no spectral shaping (NONE). All modulation techniques may use equivalent channel coders with identical coding gain. Each of these modulation techniques can be used to approach channel capacity with nearly equivalent performance.

For a channel having a flat response throughout a frequency range of interest, the channel capacity or maximum data rate (RATE) is given approximately by $$\text{RATE} = \frac{BW}{3} \, SNR \qquad (1)$$

where

BW=the bandwidth or symbol rate of the modulator; and

SNR=signal to noise ratio in dB.

The RATE is reduced by a non-ideal coding gain factor, G, and a LOSS function related to bandwidth (BW) due to spectral shaping in the channel. This shaping may include the effects of a non-white noise source injected into the channel between the transmitter of the transmit modem and the receiver of the receive modem. The LOSS is computed from the channel spectrum, $A_f$, as measured at K points across the channel. An equivalent measure used in U.S. Pat. No. 5,008,903 (for automatic pre-emphasis using equalizer error signal spectrum will include effects of colored noise.

In accordance with the invention, the channel spectrum analysis is used to optimize (maximize) the data rate function (RATE):

$$\text{RATE} = \frac{BW}{3} \left( SNR - 10 \log_{10} \frac{BW}{NBW} - G - \text{LOSS} \right) \qquad (2)$$

where

NBW=noise bandwidth used to measure noise level (typically NBW is equal to 2000 Hz for C-message weighed noise);

G=coding loss in dB, (typically G=7 dB for the popular v..33 type 8 state trellis code to achieve a bit error rate of $10^{-5}$); and LOSS=channel loss functions determined by equations (3), (4) and (5).

The LOSS functions are:

Channel loss for 50% Preemphasis:

$$\text{LOSS\_PRE} = 20 \log_{10} \frac{1}{K} \sum_{i=1}^{k} 10^{-A_f/20} \qquad (3)$$

Channel loss without DFE, MCM or Preemphasis; and $$\text{LOSS\_NONE} = 10 \log_{10} \frac{1}{K} \sum_{i=1}^{k} 10^{-A_f/10} \qquad (4)$$

Channel loss for DFEorMCM.

$$\text{LOSS\_DFE} = \frac{1}{K} \sum_{i=1}^{k} -A_f \qquad (5)$$

where

LOSS_PRE is implementing 50% (or the square root) of the channel shape for white noise.

Once the channel spectrum has been analyzed, and the desired data rate determined, the modulus converter encoder 117, such as is disclosed in U.S. Pat. No. 5,103,227 and incorporated herein by reference, is used to achieve the maximum data rate. Fractional rate modulation conversion is achieved by separating incoming data into frames of bits. Each frame is partitioned into bit words of unequal bit lengths. The words are divided by a modulus to obtain remainders. The remainders are then multiplexed into sequential bauds of common modulus.

A modulus converter, constructed in accordance with the teachings of U.S. Pat. No. 5,103,227, includes a plurality of remainder circuit means coupled in series to generate remainders by dividing the bits within a variable length word by a modulus. The number of circuit means equals the number of bauds per frame for a preselected baud and data bit rate pair. The remainders are then transmitted over a channel, for example, channel 101. At the receiver end, in, for example, modem 120, the encoding process performed by the modulus converter encoder 117 is reversed in the modulus converter decoder 127 to reconstruct the original data.

Given the data rate (RATE) and bandwidth (BW), the modulus is determined according to the relationship $$\text{MODULUS} = 2^{\frac{RATE}{BW}} \quad (6)$$

For Trellis coded modems, some data bits are transferred as a part of the trellis coding. The modulus converter operates on the so called uncoded bits or subset signal constellation. For $B_t$ trellis coded bits per baud, the modulus becomes:

$$\text{MODULUS} = 2^{\frac{RATE}{BW} - B_t} \quad (7)$$

One of the three equations (3), (4) or (5) is used to determine the optimum BW from which the maximum RATE is determined. The optimum BW depends on the modulation type (DFE,PREorNONE) in order of decreasing performance and generally the optimum BW is lower for the lower performance techniques. For each equation, the optimum bandwidth (BW) is strictly a function of $A_f$, the channel spectrum.

Figure 4:
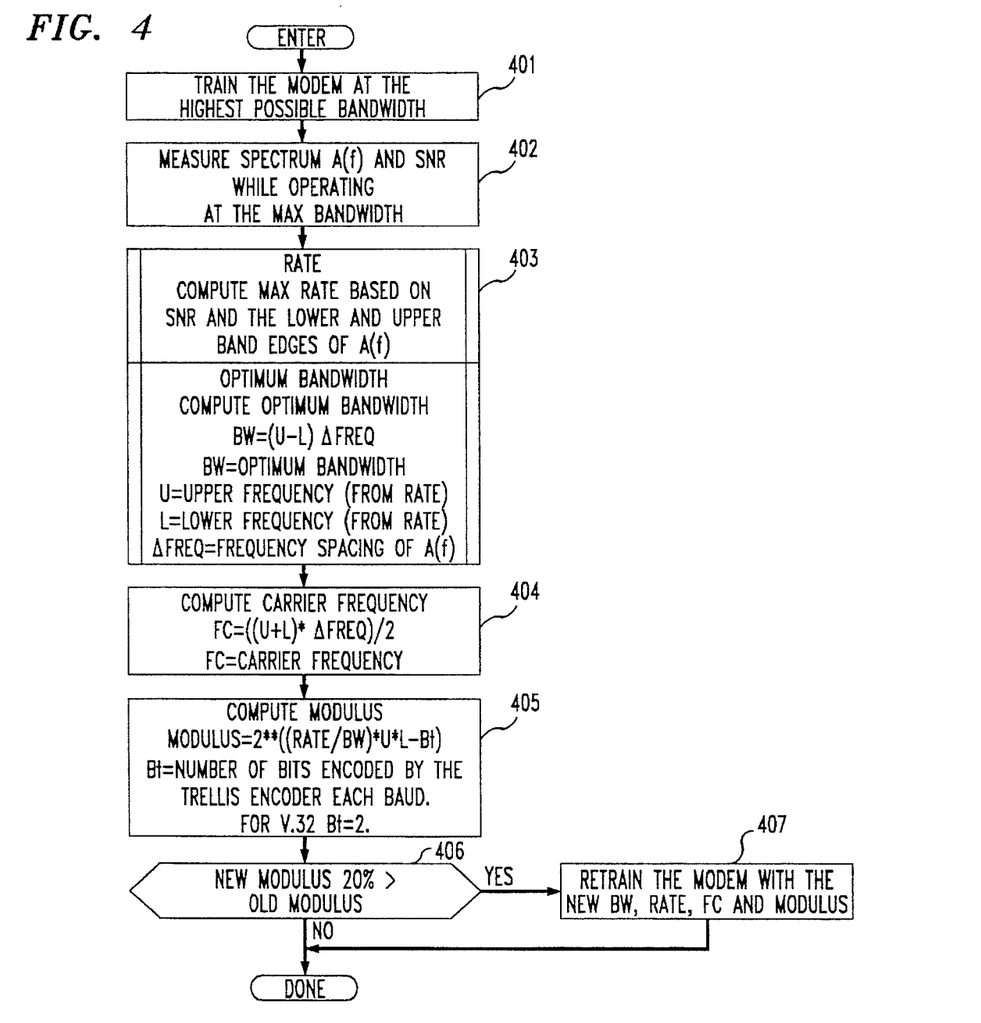
FIG. 4 is a flow chart illustrating the operation of the channel capacity modulation system with the desired functionality including criteria for the optimization process, in accordance with the invention.

Referring next to FIG. 4, there is shown a flow chart illustrating the operation of the channel capacity modulation system with the desired functionality including criteria for the optimization process. The functions provided by compute block 115, of FIG. 1, are advantageously determined by a process or program stored in read only memory (not shown).

The process is entered at step 401 where the modem is trained at the highest possible bandwidth. The modem operates over a bandwidth which is limited or constrained by the characteristics of the selected telephone channel. A typical telephone channel may have a maximum bandwidth up to 3200 Hz, which is used by recent high speed dial modems. The training sequence involves the transmitting modem sending out a known pseudo random sequence of four points on a modem constellation. The four points are chosen so that the modem training signal will have the same bandwidth and the same power as the actual data signal. The receiving modem is able to recognize which sequence is being transmitted. Thus this training signal may be generated and transmitted from, for example, modem 110 to modem 120 over the communication channel 101, all shown in FIG. 1.

From the step 401, the process advances to step 402 where the spectrum $A_f$ and SNR are measured. The spectrum may be measured by the circuitry described herein above and shown in FIG. 3. The SNR may be measured by the circuitry also described herein above and shown in FIG. 2. The measurements of both the spectrum and the SNR begin while the transmitting modem is being trained for operation at the maximum bandwidth. The process next advances to step 403 where the maximum RATE and the optimum bandwidth are computed.

The maximum RATE is computed as a function of the SNR and the upper (u) and lower (l) band edge frequencies. Since the signals being transmitted across the channel are digital signals, the signal has all elements of the frequency spectrum present in the data and therefore this data may advantageously be used rather than the modem having to specifically generate a probing signal which is only used for this purpose. So that the customer will be able to quickly get data onto the channel, the transmit modem may optionally begin transmission at a low reliable data rate while the optimal bandwidth and optimal rate parameters are being computed.

Also in step 403, the optimum bandwidth (BW=(u−l)ΔF) for the channel is computed, where ΔF is the spectrum resolution of $A_f$ or spacing between frequency samples. Although 100 Hz has illustratively been used in the design examples herein, it is to be understood that other spacings between frequency samples may be used within the framework of the invention. The maximum RATE and optimum bandwidth computations are shown in greater detail in FIG. 5.

The process next advances to step 404 where the carrier frequency $f_c=(u+1)\Delta f/2$ is computed. The carrier frequency is set in the middle of the available bandwidth.

At step 405, a modulus, or new modulus, is computed using equation (7) and $RATE_{lu}$ in the calculation. From step 405, the process advances to decision 406 where it is determined if the new modulus satisfies hysteresis criterion (such as a change of 20% of more). If so, then the modem is retrained using the new parameters at step 407. If not, the process is exited. The optimization is complete at this point. The optimum rate for transmission and reception for a modem will generally be different. In performing the optimization, it may be preferable to use only a few specific bandwidths or data rates to simplify compatibility with other techniques. In such a case only a few bandwidths need be searched.

Figure 5:
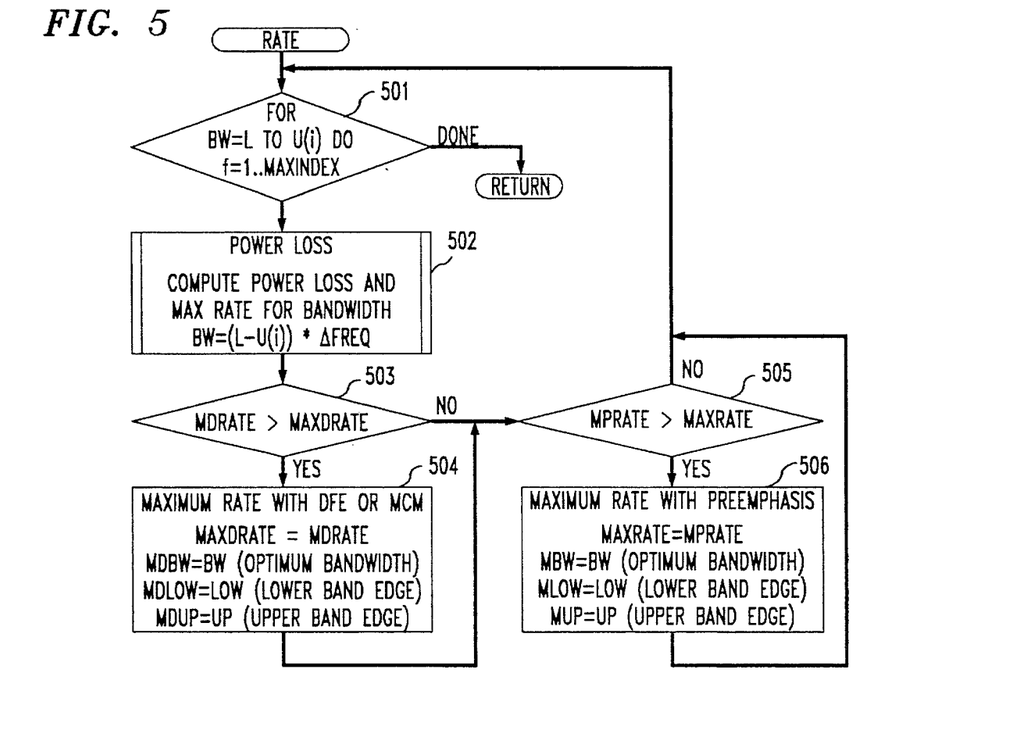
FIG. 5 is a flow chart illustrating in greater detail some of the functions provided in the flow chart of FIG. 4, in accordance with the invention.
Figure 6:
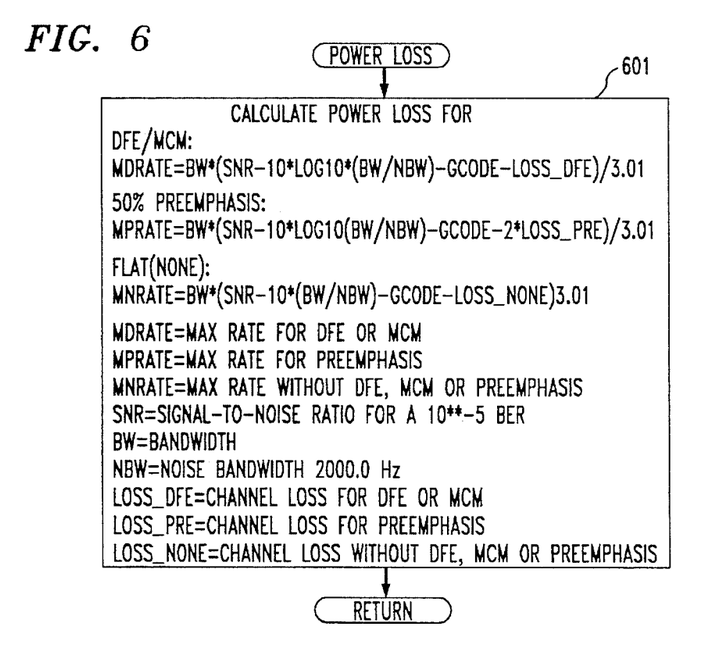
FIG. 6 is a flow chart illustrating in greater detail some of the functions provided in the flow chart of FIG. 5, in accordance with the invention.

FIG. 5 is a flow chart illustrating in greater detail the RATE and optimum bandwidth computing step 403 shown in FIG. 3. Essentially, the operation of the subroutine in FIG. 5 is such that the maximum bandwidth is found through a power loss calculation, and then for the given bandwidth the maximum rate is determined. In achieving this operation, this subroutine indexes through the channel and measures all possible sub-bandwidths available in the maximum available bandwidth. What is determined through this subroutine is 1) the best bandwidth to use and 2) where this bandwidth is centered in the maximum available bandwidth. For example, even if a maximum bandwidth of, typically, 3200 Hz is available, a bandwidth of 2400 Hz might be the optimum bandwidth for the desired data rate. Thus the subroutine indexes across the channel and, as shown for illustration purposes, determines for the ideal channel loss function DFE/MCM and also the channel loss function 50% PREEMPHASIS (PRE) just where the power loss will be at a minimum for a given data rate or, alternatively, for a desired data rate, just where the best performance within the channel is obtainable. Although both of these channel loss functions are shown in the routine, modems typically have only one, which generally is the PREEMPHASIS loss function. The DFE/MCM channel loss function is included primarily for illustrating a reference or ideal spectral shaping condition. And although the formula for calculating the no PREEMPHASIS or no DFE/MCM condition (NONE) is shown in FIG. 6, and therefore this loss function is determinable, since it is seldom used in a modem, it is not illustrated in the flow chart.

The routine for the rate and optimum bandwidth computing step is entered at decision 501 where the frequency band is sampled with an interval i from the lower frequency L to the upper frequency U for computing the channel capacity C. This data is inputted into the familiar channel capacity equation:

$$C = BW \log_2 (SNR) \quad (8)$$

where the BW is a function of the signal-to-noise ration (SNR).

From decision 501, the process advances to step 502 where the power loss and the MAX RATE for the bandwidth is determined. FIG. 6 shows the power loss equations for each of the channel spectral shaping modulation equations, DFE/MCM, 50% PREEMPHASIS and FLAT (NONE).

At decision 503, the maximum rate with DFE/MCM spectral shaping is determined in accordance with the MDRATE equation set forth in FIG. 6. And at decision 505, the maximum rate with PREEMPHASIS spectral shaping is determined in accordance with the MPRATE equation set forth in FIG. 6.

Figure 7:
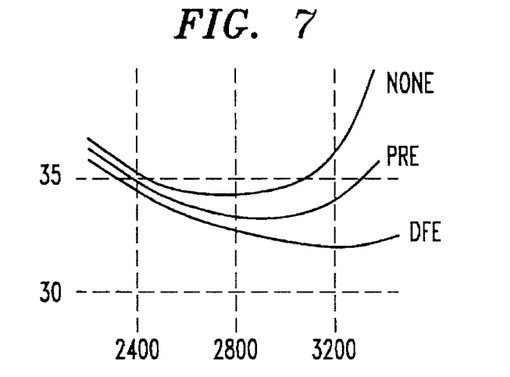
FIG. 7 is a graph which illustrates the result of using spectral shaping modulation techniques for optimizing data rate as a function of channel spectrum and the signal-to-noise ratio, in accordance with the invention.

Shown in FIG. 7 is a graph which illustrates the results of using the spectral shaping modulation techniques, DFE, PRE, and NONE for optimizing the data rate as a function of channel spectrum and SNR which is identified at the left of the graph. The curves of this figure shows the SNR required to run 19200 BPS on EIA Line 2 plotted vs. BW to show the benefit of optimization. Even the most simple spectral shaping modulation technique (PRE) will perform within 1.1 dB of the most complex technique (DFE) when the bandwidth and carrier frequency are carefully selected. The graph presumes a V.32bis type of trellis coding is used.

Figure 8:
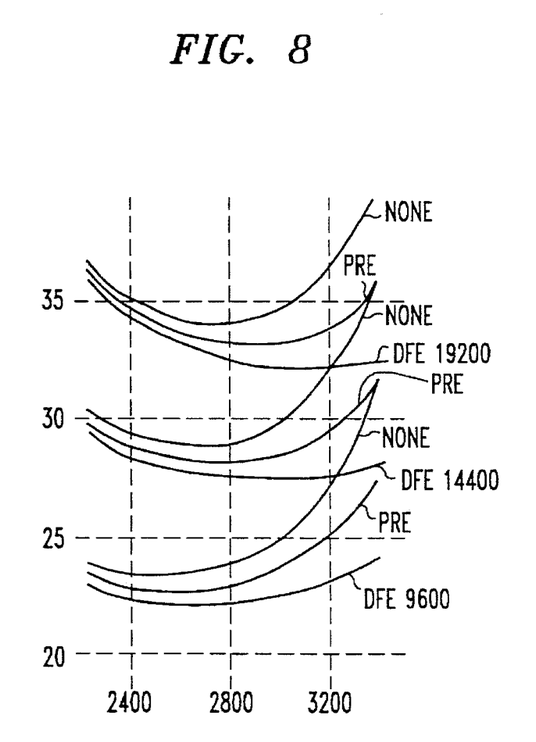
FIG. 8 is a graph which illustrates the result of using spectral shaping modulation techniques for optimizing data rate as a function of channel spectrum and the signal-to-noise ratio, in accordance with the invention.

Shown in FIG. 8 is a graph which illustrates the result of the spectral shaping modulation techniques, DFE ,PRE, and NONE for optimizing the data rate as a function of channel spectrum and SNR. The curves of this figure shows the SNR required to run at a range of data rates on EIA Line 2 and are plotted vs. BW to show the benefit of optimization.

An important result of the analysis of the curves in both FIGS. 7 and 8 suggest that the modems should not always be configured to transmit at a given rate over the widest possible bandwidth. The curves show that for a given transmission line, there is an optimal bandwidth which is narrower than the available channel capacity and for a given noise level where better performance for a selected rate actually will be achieved with a narrower bandwidth.

Figure 9:
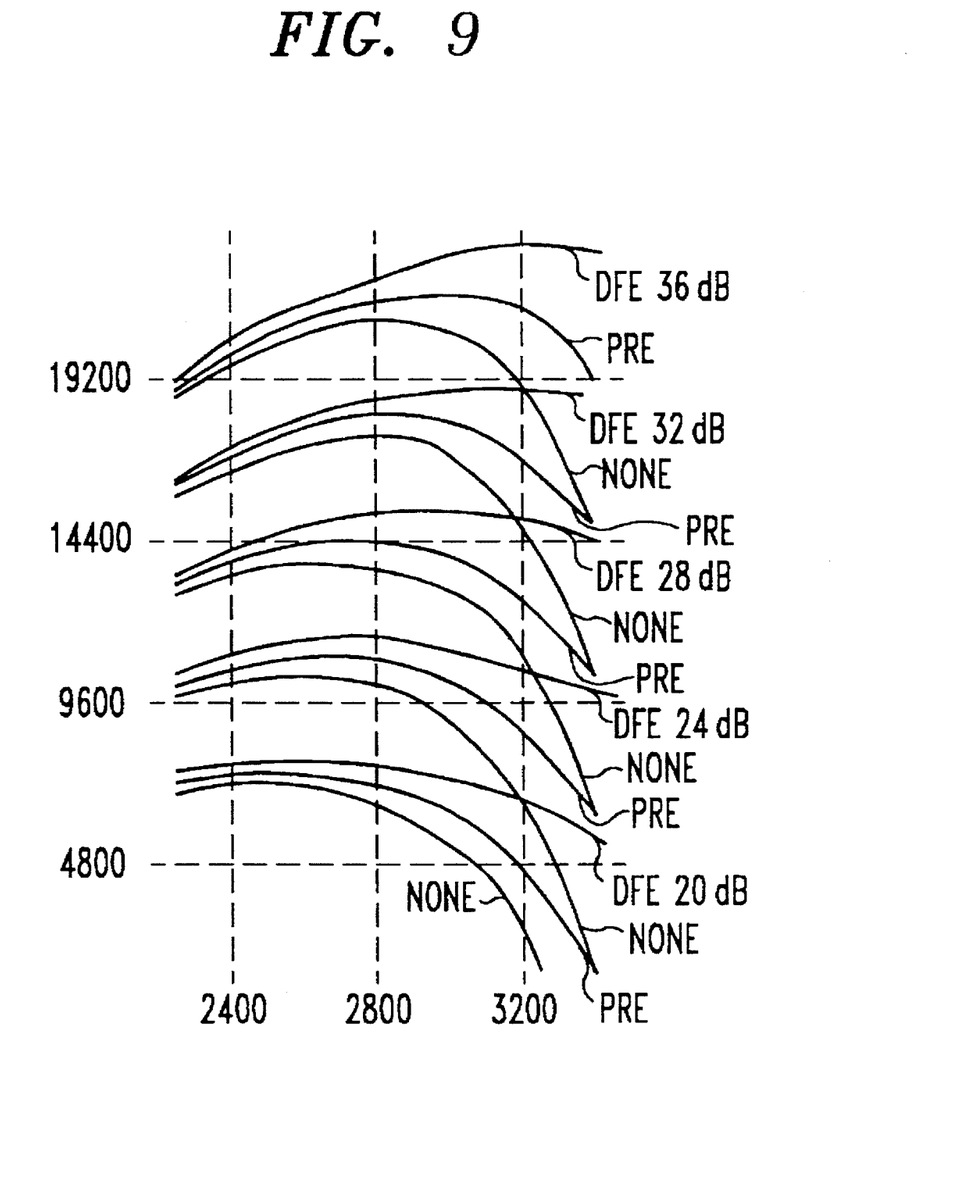
FIG. 9 is a graph which illustrates the maximum data rate being plotted verses bandwidth for a range of spectral shaping modulation techniques, in accordance with the invention.

In FIG. 9, the maximum data rate is plotted vs BW for a range of SNRs, also on EAI line 2. Three curves (DFE,PRE and NONE) are plotted for each level of SNR which is identified at the left of the curves. The optimum bandwidth is that which achieves the maximum data rate. A result of the optimization is that the optimum bandwidth decreases as the SNR decreases. Another result of optimizing SNR margin at a fixed data rate says that as the rate decreases, the optimum bandwidth decreases.

Various modifications of this invention are contemplated and may obviously be resorted to by those skilled in the art without departing from the spirit and scope of the invention as hereinafter defined by the appended claims.

We claim:

1. A method of determining an optimum bandwidth for transmission of data over a transmission line, the method comprising the steps of:

transmitting data signals having wideband characteristics from a first modem on the transmission line;

obtaining the data signals in a second modem and, in response to the wideband characteristics of said data signals, a measure of the signal and noise spectrum present on the transmission line, the measure of the signal spectrum being obtained by a spectrum analyzer, and the measure of the noise spectrum being obtained by a signal-to-noise ratio circuit;

transmitting from said second modem to said first modem data from both the spectrum analyzer and the signal-to-noise ratio circuit, the data from the spectrum analyzer being indicative of the measure of the signal spectrum present on the transmission line and the data from the signal-to-noise ratio circuit being indicative of the measure of the noise spectrum present on the transmission line; and selecting in said first modem the optimum bandwidth for the transmission of data over the transmission line responsive to the measure of the signal and noise spectrum present on the line.

2. The method of claim 1 further comprising the step of selecting an optimum data rate for the transmission line responsive to the bandwidth selecting step.

3. The method of claim 2 wherein the optimum data rate is selected in accordance with the following formula:

$$\text{RATE} = \frac{BW}{3} \left( SNR - 10 \log_{10} \frac{BW}{NBW} - G - \text{LOSS} \right)$$

where

BW=bandwidth;

SNR=signal to noise ratio in dB;

NBW=noise bandwidth used to measure noise level;

G=coding loss in dB; and

LOSS=channel loss function.

4. The method of claim 3 wherein the channel loss function is determined in accordance with the following formula:

$$\text{LOSS\_PRE} = 20 \log_{10} \frac{1}{K} \sum_{i=1}^{k} 10^{-A_i/20}$$

where $A_i$=channel spectrum measured at K points across the channel; and

LOSS_PRE implements 50% of the channel shape for white noise.

5. The method of claim 3 wherein the channel loss function is determined in accordance with the following formula:

$$\text{LOSS\_NONE} = 10 \log_{10} \frac{1}{K} \sum_{i=1}^{k} 10^{-A_i/10}$$

where $A_f$=channel spectrum measured at K points across the channel.

6. The method of claim 3 wherein the channel loss function is determined in accordance with the following formula:

$$\text{LOSS\_DFE} = \frac{1}{K} \sum_{i=1}^{k} -A_f$$

where $A_f$=channel spectrum measured at K points across the channel.

7. The method of claim 1 wherein the selecting step includes the step of determining a carrier frequency for transmitting the data in the optimum bandwidth.

8. The method of claim 7 wherein the selecting step includes determining a modulus for performing a modulus conversion of the data for transmission over the transmission line.

9. The method of claim 1 wherein the transmitting from said second modem to said first modem step further includes the step of alternately transmitting data indicative of the signal spectrum and the noise spectrum to the first modem.

10. A method of determining an optimum data rate for transmission of data over a transmission line, the method comprising the steps of:

transmitting data signals having wideband characteristics from a first modem on the transmission line;

obtaining the data signals in a second modem and, in response to the wideband characteristics of said data signals, a measure of the signal and noise spectrum present on the transmission line, the measure of the signal spectrum being obtained by a spectrum analyzer, and the measure of the noise spectrum being obtained by a signal-to-noise ratio circuit;

transmitting from said second modem to said first modem data from both the spectrum analyzer and the signal-to-noise ratio circuit, the data from the spectrum analyzer being indicative of the measure of the signal spectrum present on the transmission line and the data from the signal-to-noise ratio circuit being indicative of the measure of the noise spectrum present on the transmission line; and optimizing in said first modem both bandwidth and data rate for the transmission line responsive to the measure of the signal and noise spectrum present on the line.

11. The method of claim 10 wherein the optimum data rate is selected in accordance with the following formula:

$$\text{RATE} = \frac{BW}{3} \left( SNR - 10 \log_{10} \frac{BW}{NBW} - G - \text{LOSS} \right)$$

where

BW=the bandwidth;
SNR=signal to noise ratio in dB;
NBW=noise bandwidth used to measure noise level;
G=coding loss in dB; and
LOSS=the channel loss function.

12. A system for transmission of data between first and second modems over a bandwidth constrained transmission line, the system comprising:

means for transmitting data signals having wideband characteristics from said first modem on the transmission line;

means for decoding the data signals in said second modem;

means for decoding the data signals in said second modem;

means for measuring in said second modem both the signal and noise spectrum present on the transmission line in response to receipt of the wideband characteristics of said data signals by both a spectrum analyzer and a signal-to-noise ratio circuit, the measure of the signal spectrum being obtained by the spectrum analyzer, and the measure of the noise spectrum being obtained by the signal-to-noise ratio circuit;

means for transmitting from said second modem to said first modem data from both the spectrum analyzer and the signal-to-noise ratio circuit, the data from the spectrum analyzer being indicative of the measure of the signal spectrum present on the transmission line and the data from the signal-to-noise ratio circuit being indicative of the measure of the noise spectrum present on the transmission line; and means in said first modem for identifying both a maximum data rate and an optimum bandwidth for use by said first modem in the transmission of data over the transmission line in response to the signal and noise spectrum present on the transmission line.

13. The system of claim 2 wherein the identifying means includes means for determining a carrier frequency for use in transmitting the data in the optimum bandwidth.

14. The system of claim 13 wherein the identifying means further includes means for determining a modulus for performing a modulus conversion of the data for transmission over the transmission line.

15. The system of claim 14 further comprising means for repetitively measuring the signal and noise spectrum present on the line during a data transmission over the transmission line.

16. The system of claim 15 further comprising means for retraining the first modem for using each of a subsequently obtained maximum data rate, optimum bandwidth and modulus identified responsive to the repetitively measuring means measuring the signal and noise spectrum present on the line.

17. The system of claim 16 wherein the retraining means reconfigures the first modem when the modulus determined by the modulus determining means exceeds the previously determined modulus by a predetermined amount.

18. The system of claim 12 wherein the means for transmitting from said second modem to said first modem further includes means for alternately transmitting data indicative of the signal spectrum and the noise spectrum to the first modem.

19. The system of claim 18 wherein the optimum data rate is selected in accordance with the following formula:

$$\text{RATE} = \frac{BW}{3} \left( SNR - 10 \log_{10} \frac{BW}{NBW} - G - \text{LOSS} \right)$$

where

BW=bandwidth;
SNR=signal to noise ratio in dB;
NBW=noise bandwidth used to measure noise level;
G=coding loss in dB; and
LOSS=channel loss function.

20. A method of optimizing an analog modem for transmission of data over a bandwidth constrained transmission line, the method transmitting, in the analog modem, data signals having wideband characteristics on the transmission line;

obtaining the data signals and, in response to the wideband characteristics of said data signals, a measure of the signal and noise present on the transmission line, the measure of the signal spectrum being obtained by a spectrum analyzer, and the measure of the noise spectrum being obtained by a signal-to-noise ratio circuit;

transmitting to the analog modem data from both the spectrum analyzer and the signal-to-noise ratio circuit, the data from the spectrum analyzer being indicative of the measure of the signal spectrum present on the transmission line and the data from the signal-to-noise ratio circuit being indicative of the measure of the noise spectrum present on the transmission line; and identifying both a maximum data rate and an optimum bandwidth for use by the analog modem in the transmission of data over the transmission line in response to the measure of both the signal and noise spectrum present on the line.

21. The method of claim 20 wherein the identifying step includes the step of determining a carrier frequency for transmitting the data in the optimum bandwidth.

22. The method of claim 21 wherein the identifying step includes determining a modulus for performing a modulus conversion of the data for transmission over the transmission line.

23. The method of claim 22 further comprising the step of periodically obtaining a measure of the signal and noise spectrum present on the line during a data transmission over the transmission line.

24. The method of claim 25 further comprising the step of retraining the modem for using each of a subsequently identified maximum data rate, optimum bandwidth and modulus responsive to the step wherein a measure of the signal and noise spectrum are periodically obtained.

25. The method of claim 24 wherein the retraining step is performed when the modulus determined by the modulus determining step exceeds the previously determined modulus by a predetermined amount.

* * * * *